(12) United States Patent
Milton

(10) Patent No.: US 7,341,308 B2
(45) Date of Patent: Mar. 11, 2008

(54) BICYCLE SADDLE

(76) Inventor: Tom Milton, 3320 Butler Ct., Fairfield, CA (US) 94534-7140

( * ) Notice: Subject to any disclaimer, the term of this patent is extended or adjusted under 35 U.S.C. 154(b) by 185 days.

(21) Appl. No.: 11/114,345

(22) Filed: Apr. 26, 2005

(65) Prior Publication Data

US 2005/0236875 A1    Oct. 27, 2005

Related U.S. Application Data

(60) Provisional application No. 60/564,880, filed on Apr. 26, 2004.

(51) Int. Cl.
*B62J 1/00* (2006.01)
(52) U.S. Cl. .................. 297/202; 297/215.16
(58) Field of Classification Search ............... 297/202, 297/195.1, 201, 195.11, 215.16
See application file for complete search history.

(56) References Cited

U.S. PATENT DOCUMENTS

| | | | | | |
|---|---|---|---|---|---|
| 456,792 | A | * | 7/1891 | Brooks | 297/202 |
| 556,250 | A | * | 3/1896 | Brown | 297/202 |
| 571,388 | A | * | 11/1896 | Page | 297/202 |
| 576,969 | A | * | 2/1897 | Hunt | 297/202 |
| 581,464 | A | * | 4/1897 | Hollenbeck | 297/202 |
| 594,451 | A | * | 11/1897 | Wheeler | 297/202 |
| 621,607 | A | * | 3/1899 | Holden | 297/202 |
| 6,254,180 | B1 | * | 7/2001 | Nelson | 297/201 |
| 6,450,572 | B1 | * | 9/2002 | Kuipers | 297/195.1 |
| 6,669,283 | B2 | * | 12/2003 | Yu | 297/215.16 |
| 6,739,656 | B2 | * | 5/2004 | Yu | 297/215.16 |
| 2003/0025364 | A1 | * | 2/2003 | Antonio | 297/202 |

* cited by examiner

*Primary Examiner*—David Dunn
*Assistant Examiner*—Tania Abraham
(74) *Attorney, Agent, or Firm*—Kleinberg & Lerner, LLP; Marvin H. Kleinberg

(57) ABSTRACT

An improved molded leather bicycle saddle is provided with a carefully designed slot between the nose of the saddle and the rear of the seat portion. The slot has a circular area at the front of the saddle nose, converges slightly then diverges to a middle area before the saddle widens into the seat area. In alternative embodiments, each suited to a different rider type, the slot then converges to a triangular shape, a narrow line or a "T" shaped area. In preferred embodiments, the saddle is reinforced with a leather lamina layer bonded to the underside of the saddle to increase life and retain support. The slot, in some embodiments, may extend through the lamina layer.

9 Claims, 5 Drawing Sheets

BICYCLE SADDLE

CROSS REFERENCE TO RELATED APPLICATIONS

This is a continuation-in-part of Ser. No. 60/564,880, filed Apr. 26, 2004, the priority of which is claimed.

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention relates to bicycle seats and, more particularly, an improved saddle to provide a more comfortable riding experience.

2. Description of the Related Art

Approximately 140 years ago, a bicycle saddle was designed with a formed saddle leather body riveted to a metal frame. A tension adjustment was provided so that the saddle could be adjusted between taut and slack to fit the needs of the cyclist. That saddle is still available. Since then, variations on that design have been implemented, ranging from metal plate bases with various cushioning elements and a leather covering to plastic bases with gel padding and a plastic covering.

In an early variation, taught in the patent to Brooks, U.S. Pat. No. 456,792, a longitudinal slot was cut into a velocipede saddle and grooves were made in the underside so that the sharp edges of the slot would fall inward and not chafe or bruise the rider. At the time, it was said to be commonplace to provide a slot for ventilation.

The teaching of the Brooks patent did not gain widespread acceptance and it is believed that it was abandoned. Other saddle designs, ranging from a split, two-part saddle to gel foam padded saddles have been introduced, but none have satisfactorily provided comfort and freedom from numbness when riding for extended periods of time.

For the male cyclist, compression on the vulnerable scrotal and internal pudendal vessels and nerves and those delicate vessels intertwined with the dependent spermatic cord creates pressure on and interrupts blood flow through them. The outcome is numbness in the genitals, tenderness and bruising in the surrounding soft tissues and exposed bony points and risk of impotence and sterility.

For the female cyclist, pressure on the poorly protected external genitalia and exposed boney points create or result in painful contusions. Contrary to its name, the anatomic pelvic floor is a relatively weak structure. It is not designed to withstand extremes of weight bearing nor is it designed or structured to shield the neurovascular structures within the dependent aspects of the pelvic basin.

Accordingly, both the male and female rider is adversely affected by the available bicycle saddles. Neither sex has an advantage when riding the saddles currently in the marketplace. Both sexes can suffer numbness and bruising, especially if undertaking long journeys or participating in competitive bicycling events.

Recently, a major saddle manufacturer produced a saddle in accordance with the teachings of the patent to West III, U.S. Pat. No. 4,898,422. West III taught a progressive lengthwise opening in the saddle shell and an anatomical hollow at the points of support, for pressure relief in the perineal area. However, the rigid shell, covered with a foam or gel pad and covered with a soft, flexible cover does not provide any riding flexibility and, unlike prior art leather saddles, cannot take a "set" to accommodate the unique physical attributes of the rider.

What is needed, and what is provided by the present invention, is a bicycle saddle that can accommodate, with use, to the asymmetrical anatomy of the rider and yet avoid the pressures that led to the adverse effects inflicted by the saddles of the prior art.

SUMMARY OF THE INVENTION

According to the present invention, a state-of-the art molded leather saddle is modified to eliminate the pressures on the sensitive pubic areas of males and females, and to flex, providing added anatomic area surface support. The modification retains the ability to conform to the rider's anatomy over time and still provide the tension adjustments that enable the provision of firm or more flexible support over the life of the saddle.

At its most basic, the improvement requires that a reinforcing lamina of leather be bonded to the underside of the saddle and a slot cut along the central, longitudinal axis of the saddle. The bonded lamina is an engineered outline shape and thickness that effects flexing support motions and restores some of the integrity of the saddle and extends its useful life, without detracting from the improvements afforded by provision of the slot.

In a preferred embodiment, the slot includes a forward, middle and rear section. The middle section is the widest part of the slot which narrows through the forward and rear sections. It has been found that, by bench and road testing the various embodiments and by filming the embodiments while underway, the slot accommodates the sensitive pubic areas and permits the saddle fenders to work substantially independently to provide additional support while cycling.

In alternative embodiments, the slot shape can be modified to elongate or shorten, widen or narrow and assume various configurations such as wedge, oval, trapezoidal, or hourglass, depending upon the anatomy of the rider and her/his cycling preferences. In other embodiments, the thickness of the bonding lamina can vary, as can the area and outline of the lamina that is bonding to the saddle underside.

The novel features which are characteristic of the invention, both as to structure and method of operation thereof, together with further objects and advantages thereof, will be understood from the following description, considered in connection with the accompanying drawings, in which the preferred embodiment of the invention is illustrated by way of example. It is to be expressly understood, however, that the drawings are for the purpose of illustration and description only, and they are not intended as a definition of the limits of the invention.

DESCRIPTION OF THE EMBODIMENTS

Figure 1:
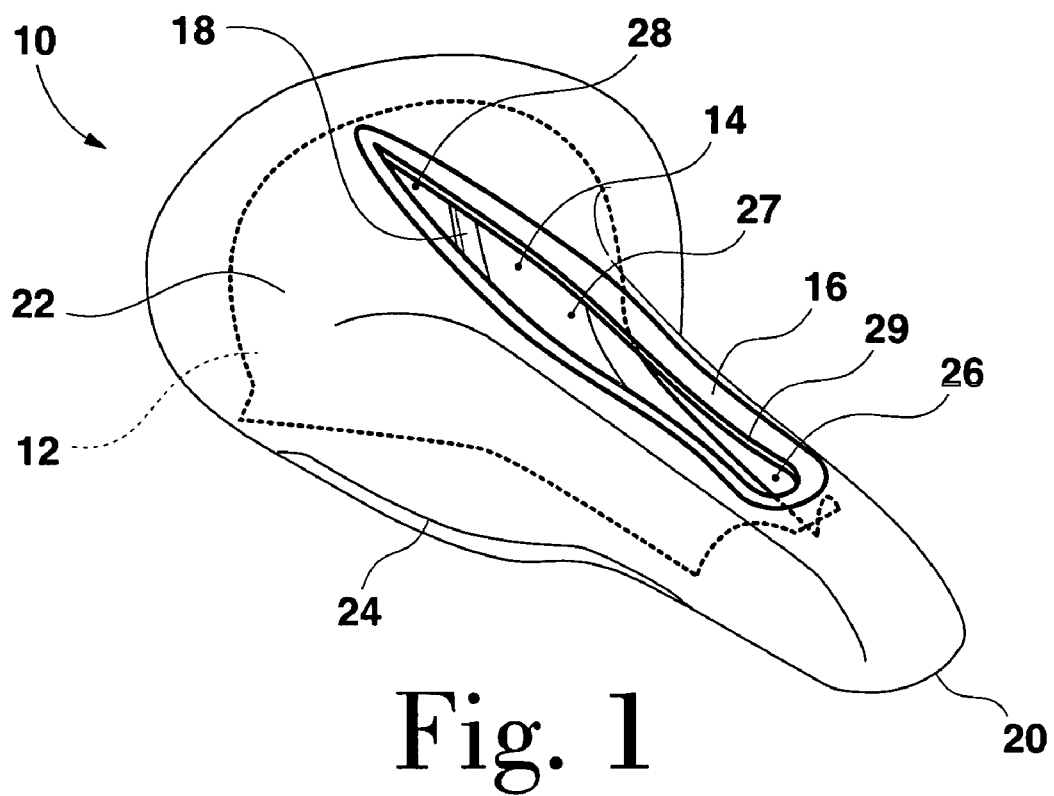
FIG. 1 is a perspective view of a saddle according to a first embodiment of the present invention.

Turning first to FIG. 1, there is shown a molded leather bicycle saddle 10 according to a preferred embodiment of the present invention. The saddle 10 is molded into its distinctive configuration using techniques well known to the art. The leather used is tanned with a smooth exterior surface and a "rough" underside surface. A lamina 12 of relatively thinner leather is bonded to the underside surface, with the rough side to rough side and the smooth side exposed.

An elongated slot 14 is cut into the saddle 10 along the central axis, through the lamina 12. The slot 14 has a chamfer 16 throughout its periphery so that no sharp edges are left to protrude. The chamfer 16 is smoothed so that there is minimal friction between the rider's clothing and the saddle 10.

Through the slot 14 may be viewed a portion of the supporting frame 18 that allows the saddle 10 to be mounted onto a bicycle. As with all saddles of this design, the saddle 10 of the preferred embodiment has a nose portion 20 and a seat portion 22. The saddle has side extensions or fenders 24 (best seen in FIG. 8) which provide a smooth leather surface against which the rider's legs can interact.

Adding the lamina 12 layer to the underside of the saddle 10, provides some reinforcement to the overall structure and helps to make up for the loss of material occasioned by the cutting of the slot 14. Depending upon the thickness of the lamina, and it can vary according to the needs of the rider. The saddle 10 retains most, if not all, of the features of the prior art saddle it supplants without the attendant problems. The added strength of the lamina 12 extends the longevity of the saddle 10.

An additional benefit flowing from the incorporation of the slot 14 into the saddle 10 is the added flexibility imparted to the fenders 24 which permit them to add additional support surface to the rider. As the rider pedals, the fenders 24 move outwardly, adding support to the rider's legs. Further, the natural tendency of the leather to conform to the body contours of the rider is not adversely affected by the addition of the slot 14 to the saddle 10.

The slot 14 has a rounded front portion 26 near the nose 20 of the saddle 10 and a wider portion 27 near the center, finally converging to a narrower portion 28 at the rear of the saddle 10. The rounded front portion 26 may be an oval or circular, with an inward bulge 29 before flaring out to the central wider portion 27.

Figure 2:
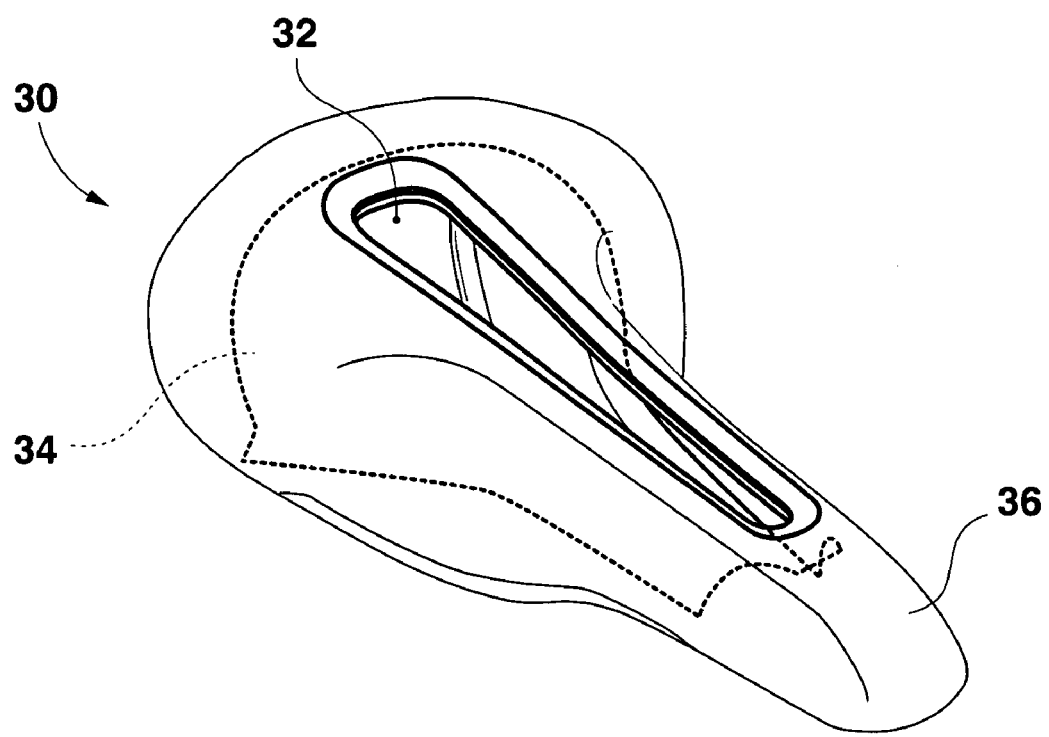
FIG. 2 is a perspective view of a saddle according to an alternative embodiment of the present invention.

In FIG. 2, an alternative embodiment of the present invention is shown. A second saddle 30, substantially similar to the saddle 10 of FIG. 1, is provided with an alternative slot 32. This slot 32, too, has a peripheral chamfer. A lamina 34 is bonded to the underside of the saddle 30.

The slot 32 of the alternative embodiment is substantially trapezoidal, narrow at the nose 36 of the saddle and widening at the rear of the seat portion. This shape is an alternative to the preferred embodiment, particularly providing for long distance cycling comfort.

Figure 3:
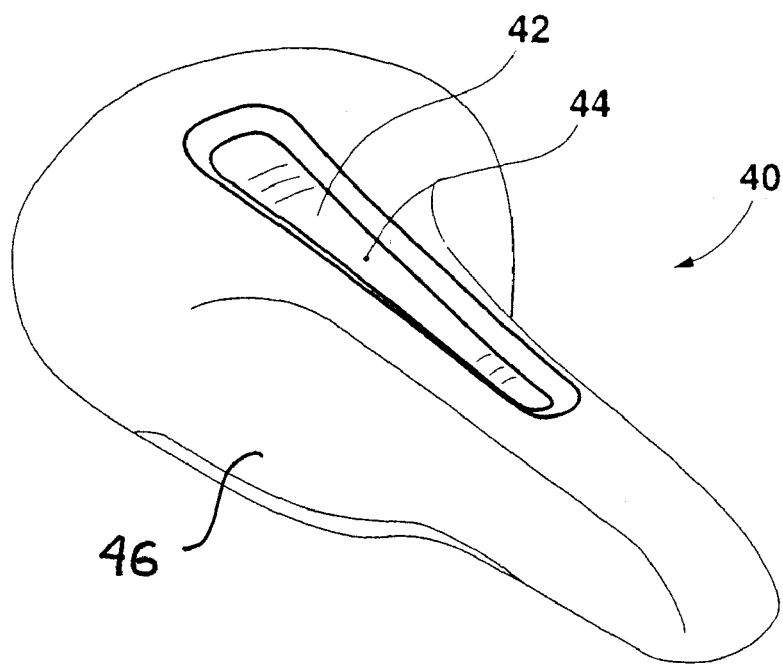
FIG. 3 is a perspective view of a saddle according to another alternative embodiment of the present invention.

FIG. 3 shows yet another embodiment of a saddle 40 according to the present invention. A lamina 42 is added after the slot 44 is cut and chamfered. The slot 44 in this embodiment is substantially similar in shape to the slot 32 of FIG. 2. Adding the lamina 42 after cutting the slot 42 stiffens the saddle 40 somewhat and renders it slightly less flexible. However, the fenders 46 do flex to provide additional seating support while pedaling.

Figure 4:
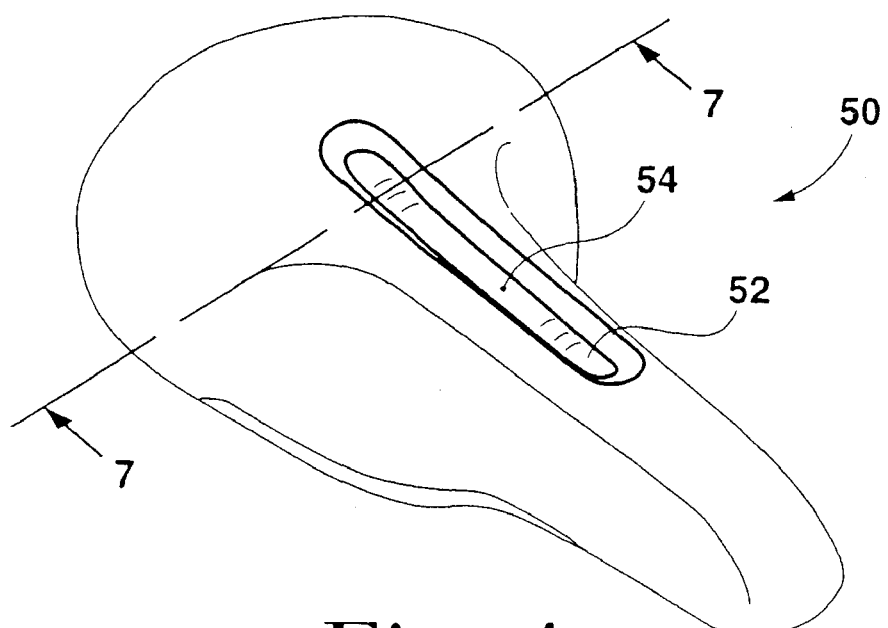
FIG. 4 is a perspective view of a saddle according to a different embodiment of the present invention.

The embodiment of FIG. 4 also features a saddle 50 to which the lamina 52 has been added after the cutting and chamfering of a slot 54. In this embodiment, the slot 54 is almost of uniform width throughout, experiencing a slight divergence at the rear of the saddle 50.

Figure 5:
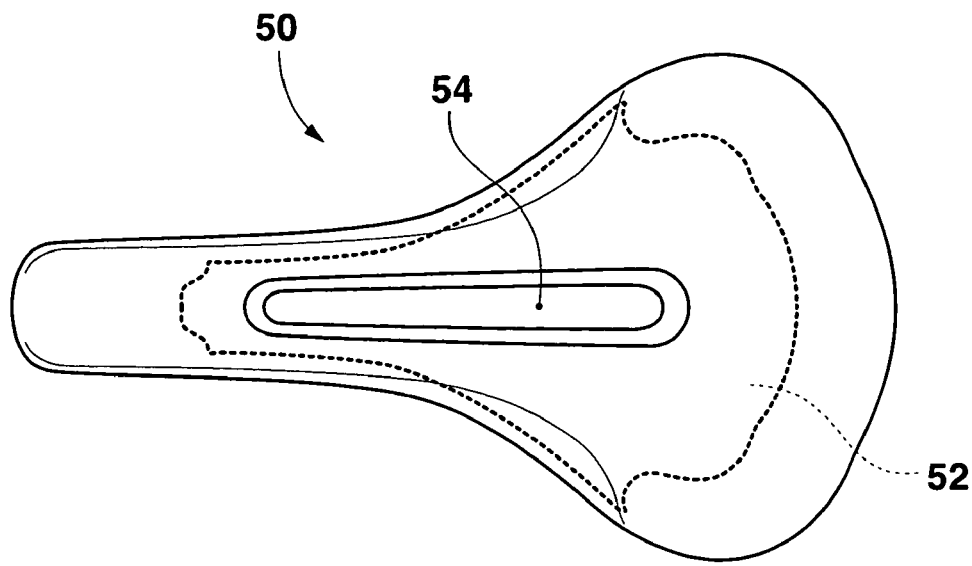
FIG. 5 is a plan view of the underside of the saddle of FIG. 4.

A top view of the saddle 50 of FIG. 4 is shown in FIG. 5. The outline of the lamina 52 is shown in dotted lines. As shown, the lamina 52 is somewhat smaller in overall area then the corresponding lamina of the other embodiments shown hereinabove.

Figure 6:
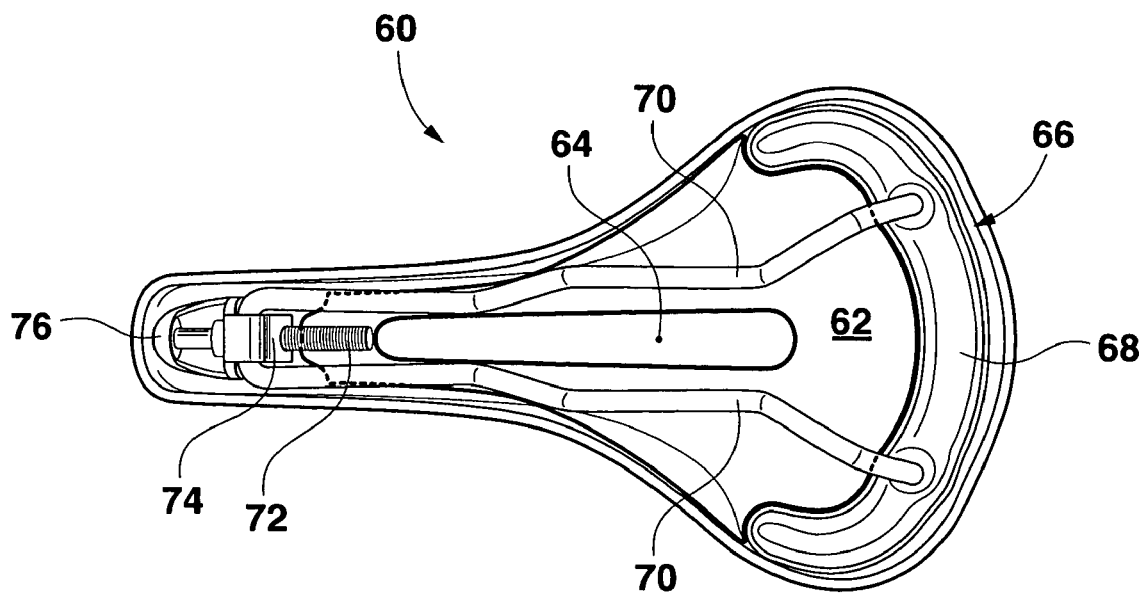
FIG. 6 is a plan view of the underside of the saddle of FIG. 5 with the frame attached.

FIG. 6 is a bottom view of a saddle 60. The lamina 62 is plainly seen covering the underside of the saddle 60. In this embodiment, for illustrative purposes, the slot 64 is cut after the lamina 62 is in place. The slot 64 of this embodiment is substantially similar to the slot of FIGS. 4 and 5. In this view, the frame 66 is more clearly shown. For the present invention, a prior art frame is employed inasmuch as the frame or its design forms no part of the present invention. For completeness, however, the elements of the frame will be described. A c-shaped plate 68 provides support to the rear portion of the saddle 60. A pair of rails 70 extend to the front of the saddle 60 and are attached to the hardware that mounts the saddle 60 on the bicycle.

A threaded rod 72 is captured in a carriage 74 near the nose of the saddle 60 which is mounted on the rails 70. A nosepiece 76 butts against the front inside edge of the nose of the saddle 60. As the threaded rod 72 is rotated in the carriage, the nosepiece 76 exerts greater or lesser force on the saddle nose, placing it under greater or lesser tension which, in turn, determines how "stiff" or "soft" the saddle will be.

Figure 7:
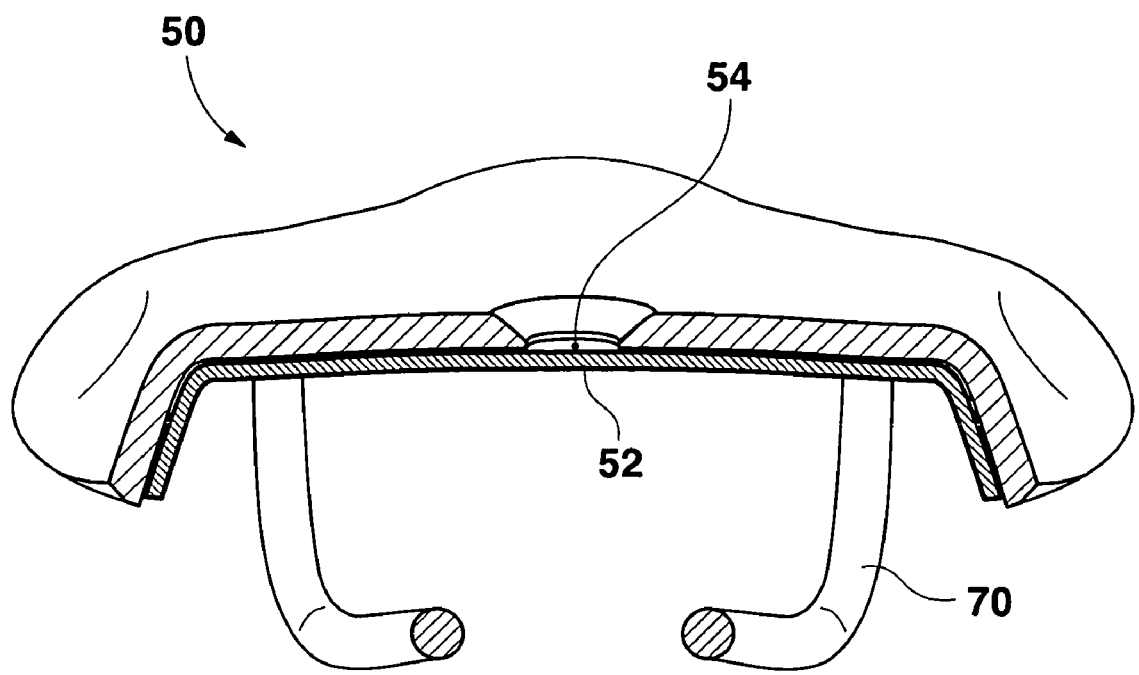
FIG. 7 is a section view of the saddle of FIG. 4 taken along line 7-7 in the direction of the appended arrows.

Turning next to FIG. 7, there is shown, in section, the saddle of FIG. 4, in which the slot 54 does not penetrate the lamina 52. The rails 70 (understanding that all of the saddles may use the same mounting hardware) support the saddle 50 at the rear and at the nose with the saddle 50 suspended under tension between them. The bonding of the lamina 52 to the saddle provides extra support to offset any weakness that might be introduced by the slot 54.

Figure 8:
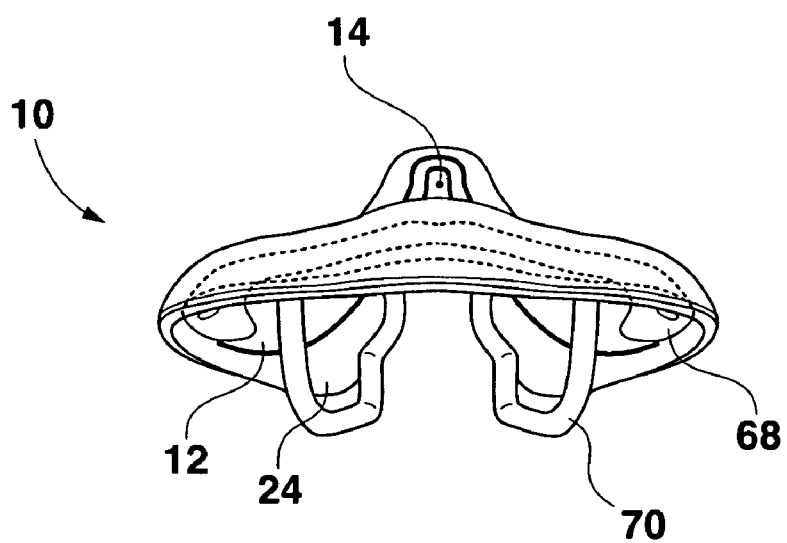
FIG. 8 is a rear end view of the saddle of FIG. 1.

In FIG. 8, there is a rear view of the saddle of FIG. 1, although it could be a rear view of any of the embodiments of the present invention. The features of the saddle 10, such as the lamina 12, the slot 14 and the fenders 24 as well as the c-shaped plate 68 and the support rails 70 are all visible in this view.

Figure 9:
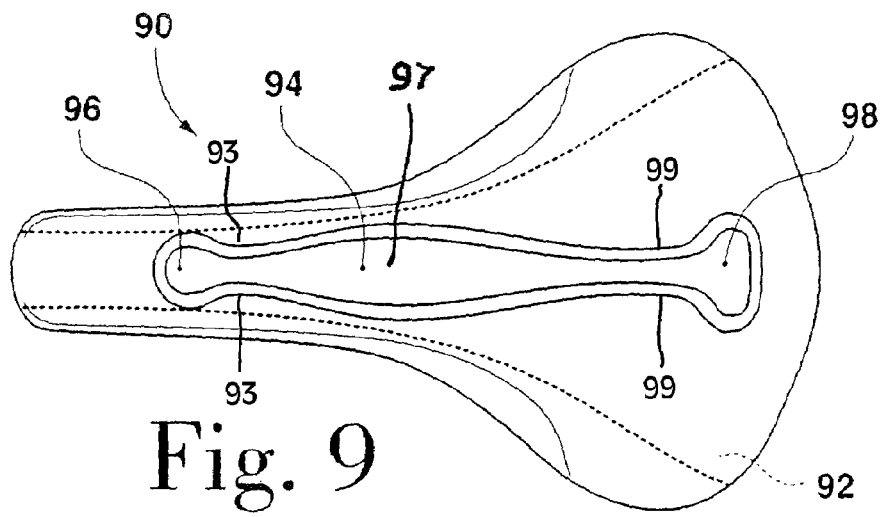
FIG. 9 is a top view of another alternative slot configuration.
Figure 10:
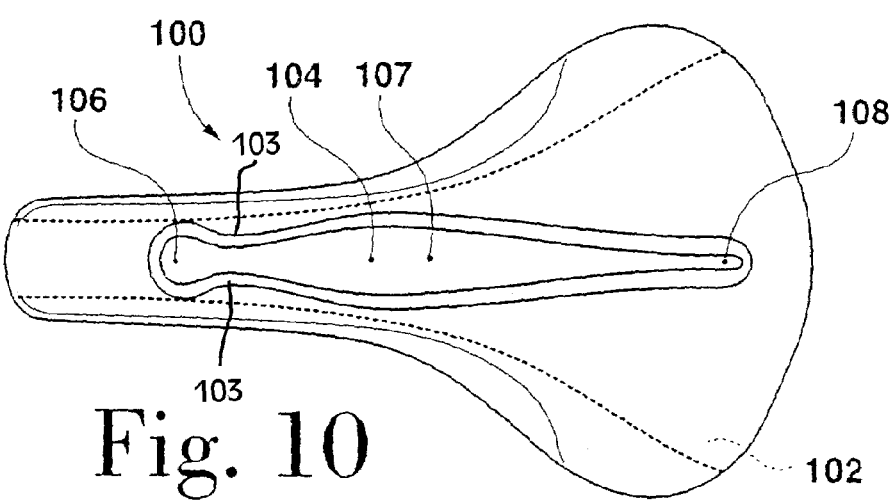
FIG. 10 is a top view of another alternative slot configuration.
Figure 11:
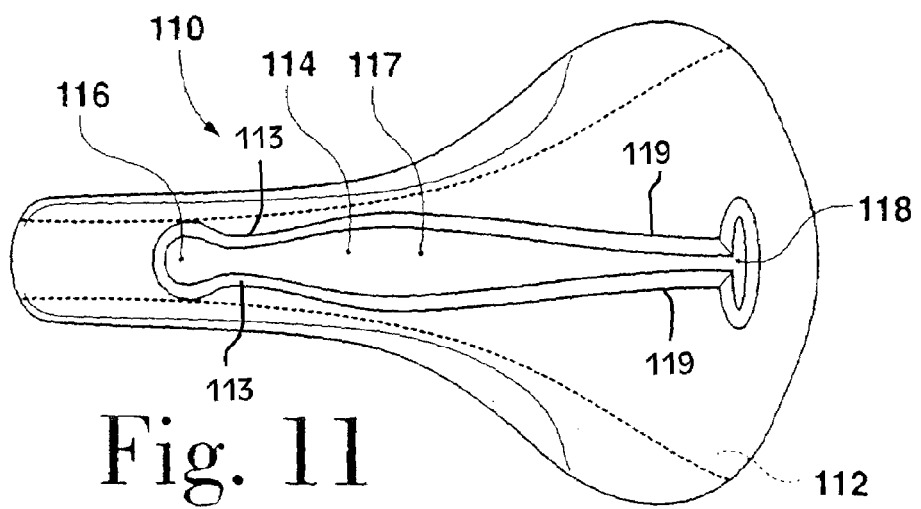
FIG. 11 is a top view of yet another alternative slot configuration.

Yet additional slot shapes are illustrated in FIGS. 9-11. As with FIG. 1, the outline of a lamina is indicated by dotted lines. The embodiments of FIGS. 9-11 have substantially similar shapes from the forward end through approximately 70% of the slot, differing primarily in the shape of the rear portion of the slot.

In FIG. 9, an alternative slot shape is shown incorporated in saddle 90. The shape of the lamina 92 is indicated by the dotted lines. The slot 94 is characterized by the substantially circular portion at the front 96 of the slot 94. The slot 94 diverges smoothly to a widest part 97 at that portion of the saddle where it flares to form the seat. This creates a pair of flexible flaps 93 between the front 96 of the slot 94 and the widest part 97. The slot 94 then converges uniformly until the widest part of the seat, at which point it flares into a flattened oval or triangular shape 98 thus creating the second pair of flexible flaps 99.

The saddle 100 of FIG. 10 includes a lamina 102 substantially similar to the lamina 92 of FIG. 9. The forward and central portions 106, 107 of the slot 104 are substantially similar to the forward and central portions of the slot 94 of FIG. 9. Here, as in FIG. 9, a pair of flexible flaps 105 are created between the forward 106 and central portions of the slot 104. In this embodiment, however, the slot 104 tapers to the rear of the saddle 100 and is at a minimum width at the rearward end 108 of the slot 104.

Yet another slot shape is illustrated in FIG. 11. A saddle 110 has a lamina portion 112 similar to that of the saddles of FIGS. 9 and 10, as well as a slot 114 that, in its forward and central sections 116, 117 are also similar to the slots 94, 104 of FIGS. 9 and 10, which creates a first pair of flexible flaps 115. The rearmost portion 118 of the slot 114 is in the shape of a "T" and is approximately the width of the front portion of the slot 114 which creates a second pair of flexible flaps 119.

Thus there has been shown and described an improved bicycle saddle that utilizes a time proven leather saddle structure that has been modified by reinforcing the saddle with a lamination of leather and placing on the seating surface, a longitudinal slot that relieves stress and pressure in the area normally occupied by the genitals of the rider and the delicate tissues and vessels that would otherwise be forced to rest on the saddle. The slot is chamfered to provide greater comfort to the rider. As with prior art saddles, the tensioning of the saddle can be adjusted and, with time, the saddle will deform and conform to accommodate the physical features of the rider. The addition of a slot and a reinforcing laminate enable saddle tilt adjustments that balance body core weight and provide relief of unwanted pressure and stress on the ands, arms, head, neck and shoulders of the rider.

What is claimed as new is:

1. A cycle saddle comprising:
    a. a molded leather shell having a forward nose portion and a rearward seat portion;
    b. a slot in said shell along a central longitudinal axis extending from said nose portion to said seat portion:
    c. a substantially circular area terminating said slot in said nose portion; and
    d. a divergence from said circular area toward a middle region of said slot forward of said seat portion creating a first pair of flexible flaps between said circular area and said said middle region;
    wherein said slot has a slight convergence before diverging from said circular area.

2. The cycle saddle of claim 1, above, further including a leather lamina layer bonded to the underside of said shell.

3. The cycle saddle of claim 2 above, wherein said slot extends through said lamina layer.

4. The cycle saddle of claim 1, above, wherein said slot converges from said middle region to a wider triangular area terminating said slot in said seat portion creating a second pair of flexible flaps between said middle region and said seat portion.

5. The cycle saddle of claim 4, above, further including a leather lamina layer bonded to the underside of said shell.

6. The cycle saddle of claim 5, above, wherein said slot extends through said lamina layer.

7. The cycle saddle of claim 1, above, wherein said slot converges from said middle region to a wider "T" shaped area terminating said slot in said seat portion creating a second pair of flexible flaps between said middle region and said seat portion.

8. The cycle saddle of claim 7, above, further including a leather lamina layer bonded to the underside of said shell.

9. The cycle saddle of claim 8, above, wherein said slot extends through said lamina layer.

* * * * *